Patented Oct. 18, 1932

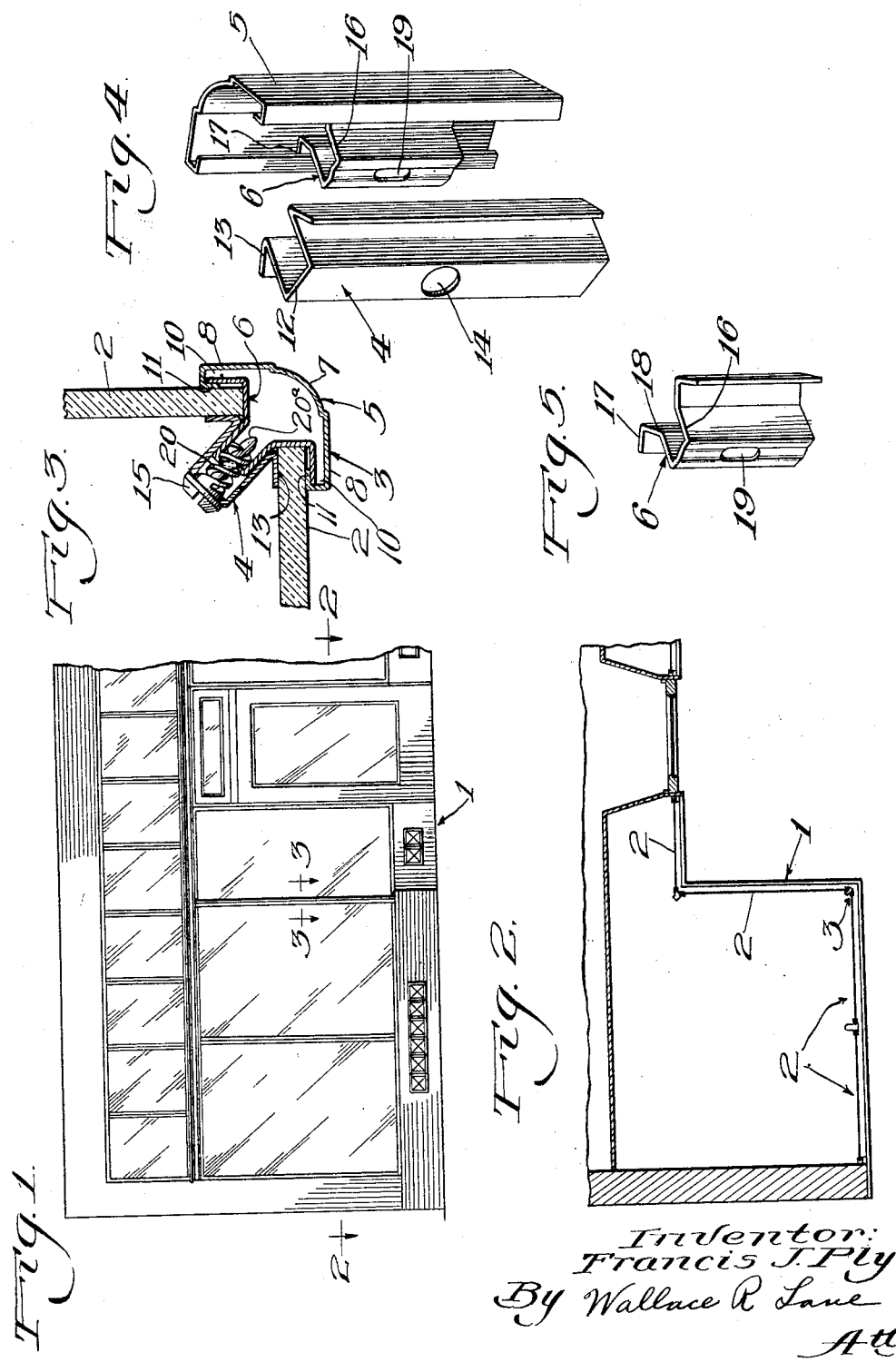

1,882,880

UNITED STATES PATENT OFFICE

FRANCIS J. PLYM, OF NILES, MICHIGAN, ASSIGNOR TO THE KAWNEER COMPANY, OF NILES, MICHIGAN, A CORPORATION OF MICHIGAN

STORE FRONT CONSTRUCTION

Application filed April 28, 1930. Serial No. 447,860.

The present invention relates to store front constructions, and more in particular to retaining or joining means for securing and positioning adjacent sections of glass or the like.

Among the objects of the present invention is to provide a novel construction whereby adjacent panes of glass or the like may be easily and readily secured and set in a store front construction.

Another object of the invention is to provide novel means and structure for securely holding adjacent sections of glass in place, such means including structure whereby the gripping or engaging force necessary to firmly retain the glass in position is distributed over a substantial area adjacent the edges of the glass to eliminate possibility of concentrated applied forces which might otherwise set up internal stresses and strain in the glass, and which would result in the cracking and shattering thereof.

The invention comprehends the idea of providing an adjustable means slidably engaging with one of the glass retaining members, which may easily and readily slide therealong, and to provide suitable means for engaging this member for drawing the glass retaining members into engagement with the panes of glass, the force applied to this adjustable means being distributed substantially equally to those parts engaging with the retaining means, and then equally and over an enlarged and increased area along the edges of the glass, thereby decreasing the unit of force, per unit of area along the edges of the glass.

The invention further comprehends the idea of providing a construction wherein the above described adjustable means is provided with parts adapted, when the glass retaining members are drawn into engagement with the adjacent sections of glass, to abut and seat against the edges of the glass for properly aligning and positioning the device and sections of glass.

A further object of the invention is to provide a novel construction comprising an inner and outer glass retaining member for engaging with the edges of adjacent sections of glass, which members are drawn into such engaging position by way of clamping members spaced along and slidably engaging the outer of said members, novel means being provided in the inner of said members and engaging this clamping member for drawing the same inwardly when tightened.

In the embodiment selected to illustrate the invention, these clamping members are formed from a piece of metal bent to form a substantially U-shaped body portion, the walls of which are further bent to provide substantially V-shaped flange parts or portions. The outer edge of these flange parts are bent to engage with the flanges of the outer glass retaining member, while the inner portion thereof is bent to provide a seat or abutting portion for the adjacent sections of glass and to properly align these sections and the glass retaining construction.

The U-shaped body portion extends inwardly and between the edges of the sections of glass and is received between the side portions of the inner glass retaining member. An elongated slot or opening is provided in the inner end wall of the clamping member, this wall being crimped to provide this slot or aperture with offset edges. A screw member is provided in the inner member and adapted to threadedly engage the edges of the slot for drawing the glass retaining members into engagement with the sections of glass, the walls of the slot being intercepted between adjacent threads of the screw member.

Other objects, features, capabilities and advantages are comprehended by the invention as will later appear, and as are inherently possessed thereby.

Referring to the drawing:

Fig. 1 is a fragmentary view in front elevation of a store front provided with the novel construction of glass retaining means.

Fig. 2 is a view in horizontal cross section taken through the store front construction in a plane represented by the line 2—2 of Fig. 1 of the drawing.

Fig. 3 is a view in horizontal cross section taken in the plane represented by the line 3—3 of Fig. 1 of the drawing, and disclosing the present novel construction in a corner bar of the store front construction.

Fig. 4 is a view in perspective of the construction shown in Fig. 3 of the drawing, and showing the members thereof spaced apart and in their relative positions prior to their assembly thereof.

Fig. 5 is a view in perspective of the clip or clamping member used in the present novel glass retaining means.

Referring now more in detail to the drawing, the invention is disclosed in a store front 1, the same being constructed and assembled from a plurality of adjacent sections of glass 2, two adjacent panes of glass having their edges secured and held by a retaining means 3, to be presently described.

The present novel retaining means 3 is shown as being constructed in a proper shape to provide a suitable corner bar for receiving the edges of adjacent and angularly disposed panes of glass, although it is to be understood that the shape of this corner bar may vary, as desired, to likewise provide divisional bars or reverse bars, without departing from the spirit of the invention.

The corner bar 3 is shown as comprising an inner and outer glass retaining member 4 and 5, respectively, and a clamping member 6, this clamping member 6 being adapted to slidably engage the outer glass retaining member and for drawing the same, together with the inner glass retaining member into contacting engagement with the edges of the glass section by suitable means in the inner glass retaining member, which is adapted to threadedly engage therewith, and for securing these adjacent panes in position.

The outer glass retaining member 5 is formed from an elongated piece or strip of metal which is bent to provide a substantially rounded body portion 7 which may have any design or ornamental configuration, as desired. The edges of this strip are further bent to provide the U-shaped end or edge portions 8 defining inner grooves or channels 10, the inner legs or portions 11 of which are adapted to be in a plane parallel with the adjacent sections of glass 2 and to contact therewith when the construction is in assembled position. These legs or flanged portions 11 of the outer glass retaining member are engaged by the clamping members 6 in a manner to be more fully disclosed.

The inner glass retaining member 4 likewise comprises an elongated strip or piece of sheet metal bent to form a U-shaped channel body portion 12, the sides or edges of which are further bent to form the flanges 13 which are adapted to engage or lay against the inner faces at the edge portions of the adjacent sections or panes of glass 2.

A plurality of apertures or openings 14 are provided at spaced intervals along the U-shaped channel body portion of this member through which pass screw members 15 adapted to engage with the clamping member 6 for drawing the inner and outer glass retaining members into engagement with the edges of the adjacent sections of glass 2.

Clamping or clip members 6 are provided at intervals along the corner bar, which members engage the outer glass retaining members and which in turn are engaged by a screw member 15. These clamping members are formed from a strip or piece of sheet metal which is bent to form a U-shaped channel body portion 16 adapted to fit within the U-shaped channel body portion 12 of the inner glass retaining member, the edges of which are bent outwardly and substantially in a V-shape to provide outer flanges 17 and an intermediate abutting part 18 to be furthermore fully explained.

The flanges 17 are adapted to be received in the grooves or channel 10 of the outer glass retaining member 5, and to be slidable therein and to engage and contact with the flanges 11 thereof for drawing the same into engagement with the sections of glass 2. The end wall of these clamping members is provided with an elongated aperture or slot 19 which is adapted to receive the threaded shank 20 of the screw member 15. The end wall of this clamping member is crimped or bent longitudinally thereof, as clearly shown in the drawing, so that the edges of the aperture are offset or in parallel adjacent planes, one of which is forwardly of the other, whereby the edges of the aperture may be intercepted between adjacent threads of the screw member 15.

This screw member 15 is provided with spaced helical threads of equal diameter and a projecting part or portion 20ᵃ adapted to guide and direct the screw threaded shank into engagement with the edges of the slot 19. The width of the U-shaped channel body portion of the clamping member is such that threads of the helical screw contact therewith for lending rigidity to the construction and to provide against twisting and turning of the clamping member.

The intermediate portion 18 of the outwardly extending flanges of the clamping member are adapted to abut and contact with the edges of the glass sections 2 for properly aligning the same and the glass retaining means. In an assembled position, the flanges 13 of the inner glass retaining member 4 are adapted to contact with the inner faces of the edges of the glass sections 2, while the side walls of the U-shaped body portion 12 are adapted to fit over and receive the U-shaped channel body portion 16 of the clamping member 6 to provide a rigid construction, and to insure against the lateral displacement of the clamping member and inner glass retaining member when the screw member 15 is driven home for drawing the glass retaining members into contacting engagement with the sections of glass 2. It is of course understood that the members described hereinbefore may be bent as desired to provide a construction for holding and securing adjacent sections of glass, irrespective of the relative angle at which they may be set.

In the assembly of the present construction, the clamping members are slipped onto the outer retaining member so that the flanges 17 of the clamping members are slidable within the grooves 10 and engage with the flanges 11 of the outer retaining member. The outer retaining member, with the clamping members engaging therewith, is then placed adjacent the outer faces of the edges of the glass sections 2, the U-shaped body portion 16 of the clamping members protruding inwardly and between the edges of the glass sections. The clamping members may then be slid along the outer glass retaining member to a position where the openings 19 will be aligned with the openings 14 of the inner glass retaining member. This inner member may then be inserted over the body portion of the clamping members, a screw being then inserted in the openings 14 to engage in the openings 19. The screw members may then be driven home to draw the inner and outer glass retaining members into contacting engagement with the glass sections and to rigidly and securely hold the same in position.

While I have herein described and upon the drawing shown an illustrative embodiment of the invention, it is to be understood that the invention is not limited thereto, but may comprehend other constructions, arrangements of parts, details and features without departing from the spirit of the invention.

Having thus disclosed the invention, I claim:

1. In a store front construction, the combination of an inner and outer glass retaining member adapted to hold the edges of a pair of window panes therebetween, a clamping member engaging one of said retaining members and provided with an aperture, the edges of said aperture being offset, and a screw in one of said members adapted to engage said offset edges for drawing said retaining members into engagement with said panes.

2. In a store front construction, the combination of an inner and outer glass retaining member adapted to hold the edges of a pair of window panes therebetween, a clamping member engaging one of said retaining members and provided with an aperture, and a screw member in one of said retaining members and adapted to engage in said aperture, the edges of said aperture being intercepted between adjacent threads of said screw for drawing said retaining members into contacting engagement with said panes.

3. In a store front construction, the combination of an inner and outer glass retaining member, said members being provided with flanges adapted to hold the edges of a pair of window panes therebetween, said inner member having an inwardly projecting body portion, a clamping member, said member having outer flanges for engaging the flanges of the outer retaining member, and an inwardly projecting body part engaged in the body portion of the inner retaining member, and means in said inner retaining member and adapted to engage with said clamping member for drawing the retaining members into engagement with the panes.

4. In a store front construction, the combination of an inner and outer glass retaining member, said members being provided with flanges adapted to hold the edges of a pair of window panes therebetween, a clamping member, said member having outer flanges for engaging the flanges of the outer retaining member, and abutting the edges of window panes, and a body portion extending inwardly between said edges and the flanges of said inner retaining member and means in said inner retaining member and adapted to engage said clamping member for drawing said retaining members into engagement with said panes.

5. In a store front construction, the combination of an inner and outer glass retaining member, said members being provided with flanges adapted to hold the edges of a pair of window panes therebetween, a clamping member, said member being provided with substantially V-shaped flanges, said flanges having a part engaging the flanges of the outer retaining member and a part adapted to abut the edges of said panes, and an inwardly projecting body portion extending between the flanges of the inner retaining member, and means in said inner retaining member and engaging said body portion for drawing said retaining members into engagement with said panes.

6. A clamping member for store front constructions, comprising a piece of sheet metal bent to form a body portion, said portion being further bent to provide laterally extending flanges, the end wall of said portion being provided with an aperture, said end wall being bent to offset the edges of said aperture, whereby said edges may be intercepted between adjacent threads of a screw member adapted to be received in said aperture.

7. In a store front construction, the combination of an inner and an outer glass retaining member adapted to hold the edges of a pair of window panes therebetween, a clamping member engaging said outer member and slidable within said inner member, and means in said inner member and engaging said clamping member for drawing said outer member into contacting engagement with said panes.

8. In a store front construction, the combination of an inner and an outer glass retaining member adapted to hold the edges of a pair of window panes therebetween, a clamping member engaging said outer member and having a flange part abutting the edge of said panes of glass, said member being slidable within said inner member, and means in said inner member and engaging said clamping member for drawing said outer member into contacting engagement with said panes.

9. In a store front construction, the combination of an inner and an outer glass retaining member adapted to hold the edges of a pair of window panes therebetween, said inner member having a channel-shaped body portion, a clamping member engaging said outer member and fitting within said channel shaped body portion, and means in said inner member and engaging said clamping member for drawing said outer member into contacting engagement with said panes.

10. In a store front construction, the combination of an inner and an outer glass retaining member adapted to hold the edges of a pair of window panes therebetween, said inner member having a channel shaped body portion, a clamping member engaging said outer member, said clamping member being provided with a flange part abutting the edge of said pane of glass and having a part fitting within said channel-shaped body portion, and means in said inner member and engaging said clamping member for drawing said outer member into contacting engagement with said panes.

11. In a store front construction, the combination of an inner and an outer glass retaining member adapted to hold the edges of a pair of window panes therebetween, said inner member having a channel-shaped body portion, a clamping member engaging said outer member, said clamping member being provided with a flange part abutting the edge of said panes of glass and having a channel-shaped part fitting within the channel-shaped portion of said inner member, and means in said inner member and engaging said clamping member for drawing said outer member into contacting engagement with said panes.

12. In a store front construction, the combination of an inner and an outer glass retaining member adapted to hold the edges of a pair of window panes therebetween, a clamping member engaging said outer member, said clamping member frictionally engaging said inner member, and means in said inner member and engaging said clamping member for drawing said outer member into contacting engagement with said panes.

13. In a store front construction, the combination of an inner and an outer glass retaining member adapted to hold the edges of a pair of window panes therebetween, a clamping member engaging said outer member, said clamping member frictionally engaging said inner member and having parts abutting the edge of said panes of glass for positioning the same and said members, and means in said inner member and engaging said clamping member for drawing said outer member into contacting engagement with said panes.

14. In a store front construction, the combination of an inner and an outer glass retaining member adapted to hold the edges of a pair of window panes therebetween, a clamping member engaging said outer member, and a screw member engaging said inner and clamping member for drawing said outer member into contacting engagement with said panes, the threads of said screw member contacting with the walls of said clamping member.

15. In a store front construction, the combination of an inner and an outer glass retaining member adapted to hold the edges of a pair of window panes therebetween, a clamping member engaging said outer member and having parts abutting the edge of said panes of glass, and a screw member engaging said inner and clamping member for drawing said outer member into contacting engagement with said panes, the threads of said screw member contacting with the walls of said clamping member.

16. In a store front construction, the combination of an inner and an outer glass retaining member adapted to hold the edges of a pair of window panes therebetween, a clamping member engaging said outer member, said clamping member frictionally engaging said inner member, and a screw member engaging said inner and clamping member for drawing said outer member into contacting engagement with said panes, the threads of said screw member contacting with the walls of said clamping member.

17. In a store front construction, the combination of an inner and an outer glass retaining member adapted to hold the edges of a pair of window panes therebetween, a clamping member frictionally engaging said inner member and having parts abutting the edges of said panes of glass for positioning the same and said members, and a screw member engaging said inner and clamping member for drawing said outer member into contacting engagement with said panes, the threads of said screw member contacting with the walls of said clamping member.

18. In a store front construction, the combination of an inner and an outer glass retaining member adapted to hold the edges of a pair of window panes therebetween, said inner member having a channel shaped body portion, a clamping member engaging said outer member and having a part fitting within said channel-shaped portion of said inner member, and a screw member engaging said inner and clamping member for drawing said outer member into contacting engagement with said panes, the threads of said screw member contacting with the walls of said clamping member.

19. In a store front construction, the combination of an inner and an outer glass retaining member adapted to hold the edges of a pair of window panes therebetween, said inner member having a channel-shaped body portion, a clamping member engaging said outer member and having a channel-shaped part fitting within said channel-shaped portion of said inner member, and a screw member engaging said inner and clamping member for drawing said outer member into contacting engagement with said panes, the threads of said screw member contacting with the walls of said clamping member.

20. In a store front construction, the combination of an inner and an outer glass retaining member adapted to hold the edges of a pair of window panes therebetween, said inner member having a channel-shaped body portion, a clamping member engaging said outer member, said clamping member being provided with parts abutting the edge of said panes of glass and a channel shaped part fitting within the channel shaped portion of said inner member, and a screw member engaging said inner and clamping member for drawing said outer member into contacting engagement with said panes, the threads of said screw member contacting with the walls of said clamping member.

21. In a store front construction, the combination of an inner and outer glass retaining member adapted to retain the edges of a pair of window panes therebetween, a clamping member engaging one of said retaining members and provided with an aperture in which the edges thereof are offset, and a screw member provided with spaced threads adapted to be received in said aperture and to intercept the edges of said aperture between adjacent threads for drawing said retaining members into clamping engagement with said panes.

22. In a store front construction, the combination of an inner and outer glass retaining member adapted to hold the edges of a pair of window panes therebetween, an intermediate member engaging with said outer member, and a screw member in said inner member adapted to engage portions of said intermediate member between adjacent threads thereof for drawing said outer and inner members into engagement with said panes.

In witness whereof, I hereunto subscribe my name to this specification.

FRANCIS J. PLYM.